United States Patent
Seok

(10) Patent No.: US 9,516,647 B2
(45) Date of Patent: Dec. 6, 2016

(54) METHOD AND APPARATUS FOR TRANSRECEIVING OPERATING CHANNEL INFORMATION IN WIRELESS COMMUNICATION SYSTEM

(71) Applicant: LG ELECTRONICS INC., Seoul (KR)

(72) Inventor: Yongho Seok, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/412,660

(22) PCT Filed: Oct. 16, 2012

(86) PCT No.: PCT/KR2012/008433
§ 371 (c)(1),
(2) Date: Jan. 2, 2015

(87) PCT Pub. No.: WO2014/010786
PCT Pub. Date: Jan. 16, 2014

(65) Prior Publication Data
US 2015/0139115 A1    May 21, 2015

Related U.S. Application Data

(60) Provisional application No. 61/669,656, filed on Jul. 9, 2012.

(51) Int. Cl.
*H04W 72/04* (2009.01)
*H04W 48/08* (2009.01)
*H04W 16/14* (2009.01)
*H04W 28/20* (2009.01)
*H04W 74/00* (2009.01)

(52) U.S. Cl.
CPC ......... *H04W 72/0453* (2013.01); *H04W 16/14* (2013.01); *H04W 28/20* (2013.01); *H04W 48/08* (2013.01); *H04W 74/002* (2013.01)

(58) Field of Classification Search
CPC ........... H04W 72/0453; H04W 72/04; H04W 16/14; H04W 48/08; H04W 28/16; H04W 72/00; H04W 4/008; H04W 72/002; H04W 28/20; H94W 72/0453; H04L 27/2675; H04L 27/20; H04L 27/18; H04L 69/22
USPC ......................................... 370/329, 328, 252
See application file for complete search history.

(56) References Cited

U.S. PATENT DOCUMENTS

2011/0075759 A1    3/2011  Seok
2011/0299417 A1*  12/2011  Nanda .................. H04W 72/02
                                                        370/252

(Continued)

FOREIGN PATENT DOCUMENTS

JP    2012-060470    3/2012
JP    2013-519331    5/2013

(Continued)

OTHER PUBLICATIONS

PCT International Application No. PCT/KR2012/008433, Written Opinion of the International Searching Authority dated Feb. 28, 2013, 18 pages.

(Continued)

*Primary Examiner* — Kwang B Yao
*Assistant Examiner* — Syed M Bokhari
(74) *Attorney, Agent, or Firm* — Lee, Hong, Degerman, Kang & Waimey

(57) ABSTRACT

The present invention relates to a wireless communication system, and more specifically, disclosed are a method and an apparatus for transreceiving operating channel information. A method for providing an operating parameter of a station, which operates in a whitespace band, according to the present invention, comprises the steps of: transmitting a frame comprising an operation information field including a channel width subfield; and transmitting a signal (SIG) field of a physical layer convergence procedure (PLCP) protocol data unit (PPDU) preamble, wherein the SIG field comprises a bandwidth (BW) field, and wherein the type of the PPDU can be determined on the basis of the channel width subfield and the BW field.

19 Claims, 9 Drawing Sheets

(56) References Cited

U.S. PATENT DOCUMENTS

| | | | |
|---|---|---|---|
| 2012/0170563 A1 | 7/2012 | Abraham et al. | |
| 2013/0128807 A1* | 5/2013 | Vermani | H04L 5/0053 370/328 |
| 2013/0286959 A1* | 10/2013 | Lou | H04W 72/04 370/329 |
| 2013/0301556 A1* | 11/2013 | Porat | H04L 1/0071 370/329 |

FOREIGN PATENT DOCUMENTS

| | | |
|---|---|---|
| KR | 10-2009-0124881 | 12/2009 |
| KR | 10-2011-0093559 | 8/2011 |
| WO | 2011/099729 | 8/2011 |
| WO | 2011/112054 | 9/2011 |
| WO | 2012/023700 | 2/2012 |
| WO | 2012/091478 | 7/2012 |

OTHER PUBLICATIONS

Stacey, et al., "Resolution for CIDs 1151 and 1257 (VHT Operating Channel Width)," doc.: IEEE 80211-11/0600r1, May 2011, 3 pages.

Nee, et al., "VHT-SIG-A and VHT-SIG-B Field Structure," doc.: IEEE 802.11-10/1052r0, Sep. 2010, 9 pages.

Lee, et al., "TVHT BSS Operation and Channelization Modification Proposal," doc: IEEE 802.11-10/1012r0, Aug. 2012, 17 pages.

Seok, "TVHT BSS Operation Proposal," doc.: IEEE 802.11-10/0238r0, Jul. 2012, 6 pages.

\* cited by examiner

FIG. 6

These three fields are repeated, as determined by the Length field

| Device Type | Map ID | Channel Number | Maximum Power Level | Valid Time (Optional) |
|---|---|---|---|---|

Octets: 1    1    1    1    1

(a)

| Device Type | FCC ID | Device Serial Number |
|---|---|---|

Octets: 1    14    1

(b)

| Category | Action | Dialog Token |
|---|---|---|

Octets: 1    1    1

(c)

| Category | Action | Dialog Token | White Space Map IE |
|---|---|---|---|

Octets: 1    1    1    Variable (d)

| Category | Action | Map ID |
|---|---|---|

Octets: 1    1    1

| Element ID | Length | Operation Information | Basic MCS Set |
|---|---|---|---|
| 1 octet | 1 octet | 4 octet | 2 octet |

METHOD AND APPARATUS FOR TRANSRECEIVING OPERATING CHANNEL INFORMATION IN WIRELESS COMMUNICATION SYSTEM

CROSS-REFERENCE TO RELATED APPLICATIONS

This application is the National Stage filing under 35 U.S.C. 371 of International Application No. PCT/KR2012/008433, filed on Oct. 16, 2012, which claims the benefit of U.S. Provisional Application Ser. No. 61/669,656, filed on Jul. 9, 2012, the contents of which are hereby incorporated by reference herein in their entirety.

TECHNICAL FIELD

The present invention relates to a wireless communication system, and more particularly, to a method and apparatus for transmitting and receiving operation channel information in a wireless local area network system.

BACKGROUND ART

Wireless Local Area Network (WLAN) technology has been developed as the Institute of Electrical and Electronics Engineers (IEEE) 802.11 standard. IEEE 802.11a and 802.11b use an unlicensed band at 2.5 GHz or 5 GHz. IEEE 802.11b provides a transmission rate of 11 Mbps and IEEE 802.11a provides a transmission rate of 54 Mbps. IEEE 802.11g applies Orthogonal Frequency Division Multiplexing (OFDM) at 2.4 GHz to provide a transmission rate of 54 Mbps. IEEE 802.11n applies Multiple Input Multiple Output (MIMO)-OFDM to provide a transmission rate of 300 Mbps for four spatial streams. IEEE 802.11n supports a channel bandwidth up to 40 MHz and, in this case, provides a transmission rate of 600 Mbps.

Currently, IEEE 802.11af standard that specifies operation of an unlicensed device in a TV White Space (TVWS) band is being developed.

A TVWS includes Very High Frequency (VHF) bands (54 to 60, 76 to 88, and 174 to 216 MHz) and Ultra High Frequency (UHF) bands (470 to 698 MHz) allocated for TV broadcast and refers to frequency bands in which use of unlicensed devices is permitted under the condition that it does not hinder communication of licensed devices (a TV and a wireless microphone) operating at the corresponding frequency bands.

All unlicensed devices are permitted to operate in frequency bands of 512 to 608 MHz and 614 to 698 MHz except in a few special cases. However, frequency bands of 54 to 60 MHz, 76 to 88 MHz, 174 to 216 MHz, and 470 to 512 MHz are used only for communication between fixed devices. The fixed devices refer to devices which perform transmission only in a determined location. In the following description, a white space band includes the above-described TVWS but is not limited thereto.

An unlicensed device which desires to use the white space band should provide a protection function for a licensed device. Accordingly, the unlicensed device must confirm whether the licensed device occupies the corresponding band before starting signal transmission in the white space band.

To this end, the unlicensed device must obtain information about an available channel list (i.e. a set of available channels) in a corresponding area by accessing a Geolocation Database (GDB) through the Internet or a dedicated network. The GDB is a database for storing and managing information about licensed devices registered thereto and information about channel use which dynamically varies according to geographic location and channel use time of the licensed device. To solve a coexistence problem between unlicensed devices using the white space, a signaling protocol, such as a common beacon frame, and a spectrum sensing mechanism may be used.

In an IEEE 802.11 system, a TVWS terminal may refer to an unlicensed device operating using an IEEE 802.11 Medium Access Control (MAC) layer and a Physical (PHY) layer. In this document, a station (STA) refers to a TVWS terminal operating in a TVWS spectrum unless otherwise mentioned.

The STA should provide a function for protecting an incumbent user or a primary user that is permitted primary access, including licensed users (TV users and radio microphones). That is, if the incumbent user is using the TVWS, the STA must stop using a corresponding channel. Therefore, the STA must detect channels available to the unlicensed devices (i.e. channels which are not used by licensed devices) to operate in available channels.

A method for the STA to detect available channels includes a method for performing a spectrum sensing mechanism and a method for detecting a TV channel schedule by accessing the GDB. The spectrum sensing mechanism may use an energy detection scheme (if strength of a received signal is greater than a given value, it is determined that an incumbent user is using the TVWS) and a feature detection scheme (if a digital TV preamble is detected, it is determined that an incumbent use is using the TVWS). Next, the STA should access the GDB and acquire GDB information based on location information thereof to discern whether channels of a licensed device are being used in a corresponding location. Access to the GDB and information acquisition should be performed a prescribed number of times sufficient to protect the licensed device.

If it is determined through spectrum sensing or GDB that an incumbent user is using a channel immediately adjacent to a currently used channel, a terminal (or STA) and an Access Point (AP) can protect the incumbent user by a scheme of lowering a transmit power.

DISCLOSURE

Technical Problem

Available channels in a white space band may not be contiguous on frequency. Therefore, a conventional WLAN channel structure cannot be applied to a channel structure in the white space band. In order for an STA to correctly operate in the white space band, the STA should discern a channel structure and a permissible data unit type supported in a Basic Service Set (BSS) that an AR configures.

An object of the present invention devised to solve the problem lies in providing a method for correctly and efficiently informing an STA of operating channel information.

It will be appreciated by persons skilled in the art that that the technical objects that can be achieved through the present invention are not limited to what has been particularly described hereinabove and other technical objects of the present invention will be more clearly understood from the following detailed description.

Technical Solution

The object of the present invention can be achieved by providing a method for providing operation parameters for a station operating in whitespace band, including transmitting a frame including an operation information field, the operation information field including a channel width subfield, and transmitting a SIG (signal) field in a preamble of a PPDU (PLCP Protocol Data Unit), wherein the SIG field includes a BW (bandwidth) field, and wherein a PPDU type is determined based on the channel width subfield and the BW field.

In another aspect of the present invention, provided herein is a method for receiving operation parameters for a station operating in unlicensed spectrum, including receiving a frame including an operation information field, the operation information field including a channel width subfield, and receiving a SIG (signal) field in a preamble of a PPDU (PLCP Protocol Data Unit), wherein the SIG field includes a BW (bandwidth) field, and wherein a PPDU type is determined based on the channel width subfield and the BW field.

In a further aspect of the present invention, provided herein is an apparatus for providing operation parameters for a station operating in unlicensed spectrum, including a transceiver configured to perform transmission and reception with another device, and a processor configured to control the apparatus including the transceiver, wherein the processor is further configured to transmit a frame including an operation information field, the operation information field including a channel width subfield, and transmit a SIG (signal) field in a preamble of a PPDU (PLCP Protocol Data Unit), using the transceiver, wherein the SIG field includes a BW (bandwidth) field, and wherein a PPDU type is determined based on the channel width subfield and the BW field.

In still another aspect of the present invention, provided herein is an apparatus for receiving operation parameters for a station operating in unlicensed spectrum, including a transceiver configured to perform transmission and reception with another device, and a processor configured to control the apparatus including the transceiver, wherein the processor is further configured to receive a frame including an operation information field, the operation information field including a channel width subfield, and receive a SIG (signal) field in a preamble of a PPDU (PLCP Protocol Data Unit), using the transceiver, wherein the SIG field includes a BW (bandwidth) field, and wherein a PPDU type is determined based on the channel width subfield and the BW field.

In the aspects of the present invention, the following may commonly be applied.

The channel width may include at least one of W channel, and a value of the channel width subfield may indicate a first type channel width for one W channel, a second type channel width for two contiguous W channels, a third type channel width for two non-contiguous W channels, a fourth type channel width for four contiguous W channels, or a fifth type channel width for two non-contiguous frequency segments whereby each frequency segments is comprised of two contiguous W channels.

The PPDU type may correspond to one W channel, if the channel width subfield indicates the first type channel width and if the BW field has a first value.

The PPDU type may correspond to one W channel, if the channel width subfield indicates the second type channel width and if the BW field has the first value, and the PPDU type may correspond to two contiguous W channels, if the channel width subfield indicates the second type channel width and if the BW field has a second value.

The PPDU type may correspond to one W channel, if the channel width subfield indicates the third type channel width and if the BW field has the first value, and the PPDU type may correspond to two non-contiguous W channels, if the channel width subfield indicates the third type channel width and if the BW field has the second value.

The PPDU type may correspond to one W channel, if the channel width subfield indicates the fourth type channel width and if the BW field has the first value, the PPDU type may correspond to two contiguous W channels, if the channel width subfield indicates the fourth type channel width and if the BW field has the second value, and the PPDU type may correspond to four contiguous W channels, if the channel width subfield indicates the fourth type channel width and if the BW field has a third value.

The PPDU type may correspond to one W channel, if the channel width subfield indicates the fifth type channel width and if the BW field has the first value, the PPDU type may correspond to two contiguous W channels, if the channel width subfield indicates the fifth type channel width and if the BW field has the second value, and the PPDU type may correspond to two non-contiguous frequency segments whereby each frequency segment is comprised of two contiguous W channels, if the channel width subfield indicates the fifth type channel width and if the BW field has the third value.

The PPDU type may correspond to one W channel if the BW field has a first value and if the channel width subfield indicates one of the first, second, third, fourth or fifth type channel width.

The PPDU type may correspond to two contiguous W channels if the BW field has a second value and if the channel width subfield indicates one of the second, fourth or fifth type channel width.

The PPDU type may correspond to two non-contiguous W channels if the BW field has a second value and if the channel width subfield indicates the third type channel width.

The PPDU type may correspond to four contiguous W channels if the BW field has a third value and if the channel width subfield indicates the fourth type channel width.

The PPDU type may correspond to two non-contiguous frequency segments whereby each frequency segment is comprised of two contiguous W channels, if the BW field has a third value and if the channel width subfield indicates the fifth type channel width.

The above-described general description of the present invention and a detailed description thereof which will be described are exemplary and are for additional description for invention written in claims.

Advantageous Effects

According to the present invention, a method and apparatus for correctly and efficiently informing an STA of operating channel information can be provided.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention, illustrate embodiments of the invention and together with the description serve to explain the principle of the invention. In the drawings:

FIG. 6a is a diagram showing an exemplary WSM;

FIG. 6b is a diagram showing an exemplary format of a device ID;

FIG. 6c is a diagram showing an exemplary format of a channel availability request frame;

FIG. 6d is a diagram showing an exemplary format of a channel availability response frame; and FIG. 6e is a diagram showing an exemplary format of a CVS frame;

FIG. 7 is a diagram showing a format of an operation information element;

BEST MODE

Figure 1:
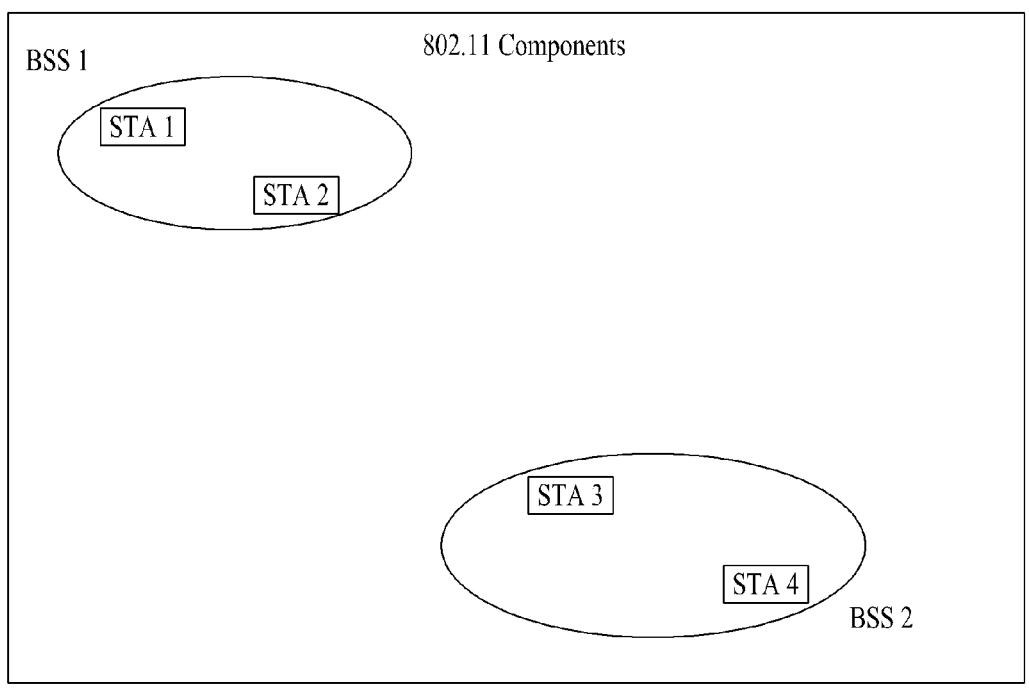
FIG. 1 is a diagram showing an exemplary structure of an IEEE 802.11 system to which the present invention is applicable.

Hereinafter, exemplary embodiments of the present invention will be described with reference to the accompanying drawings. The detailed description, which will be disclosed along with the accompanying drawings, is intended to describe exemplary embodiments of the present invention and is not intended to describe a unique embodiment through which the present invention can be carried out. The following detailed description includes specific details in order to provide a thorough understanding of the present invention. However, it will be apparent to those skilled in the art that the present invention may be practiced without such specific details.

The following embodiments are proposed by combining components and features of the present invention in a predetermined form. It may be considered that the components or the features are optional unless specially noted. The components or the features may be implemented without being combined with other components or features. The embodiments of the present invention may be realized by combinations of portions of the components and/or features. The sequence of the operations described in the embodiments of the present invention may be changed. Portions of the components and features of any embodiment may be included in other embodiments or may be replaced with the components or features corresponding to the other embodiments.

It should be noted that specific terms disclosed in the present invention are proposed for the convenience of description and better understanding of the present invention, and the use of these specific terms may be changed to another format within the technical scope or spirit of the present invention.

In some instances, well-known structures and devices are omitted in order to avoid obscuring the concepts of the present invention and the important functions of the structures and devices are shown in block diagram form. The same reference numbers will be used throughout the drawings to refer to the same or like parts.

Exemplary embodiments of the present invention are supported by standard documents disclosed for at least one of wireless access systems including an Institute of Electrical and Electronics Engineers (IEEE) 802 system, a $3^{rd}$ Generation Project Partnership (3GPP) system, a 3GPP Long Term Evolution (LTE) system, a 3GPP LTE-Advanced (LTE-A) system, and a 3GPP2 system. In particular, the steps or parts, which are not described to clearly reveal the technical idea of the present invention, in the embodiments of the present invention may be supported by the above documents. All terminology used herein may be supported by at least one of the above-mentioned documents.

The following embodiments of the present invention can be applied to a variety of wireless access technologies, for example, Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), and the like. CDMA may be embodied with radio technology such as Universal Terrestrial Radio Access (UTRA) or CDMA2000. TDMA may be embodied with radio technology such as Global System for Mobile communications (GSM)/General Packet Radio Service (GPRS)/Enhanced Data Rates for GSM Evolution (EDGE). OFDMA may be embodied with radio technology such as IEEE 802.11 (Wi-Fi), IEEE 802.16 (WiMAX), IEEE 802-20, and Evolved UTRA (E-UTRA). For clarity, the following description focuses on the IEEE 802.11 system. However, technical features of the present invention are not limited thereto.

FIG. 1 is a diagram showing an exemplary structure of an IEEE 802.11 system to which the present invention is applicable.

The structure of the IEEE 802.11 system may include a plurality of components. A WLAN which supports transparent STA mobility for a higher layer may be provided by mutual operations of the components. A Basic Service Set (BSS) may correspond to a basic building block in an IEEE 802.11 LAN. In FIG. 1, two BSSs (BSS1 and BSS2) are shown and two STAs are included in each of the BSSs (i.e. STA1 and STA2 are included in BSS1 and STA3 and STA4 are included in BSS2). An ellipse indicating the BSS in FIG. 1 may be understood as a coverage area in which STAs included in the corresponding BSS maintain communication. This area may be referred to as a Basic Service Area (BSA). If an STA moves out of the BSA, the STA cannot directly communicate with the other STAs in the corresponding BSA.

In the IEEE 802.11 LAN, the most basic type of BSS is an Independent BSS (IBSS). For example, the IBSS may have a minimum form consisting of only two STAs. The BSS (BSS1 or BSS2) of FIG. 1, which is the simplest form and in which other components are omitted, may correspond to a typical example of the IBSS. Such configuration is possible when STAs can directly communicate with each other. Such a type of LAN is not prescheduled and may be configured when the LAN necessary. This may be referred to as an ad-hoc network.

Memberships of an STA in the BSS can be dynamically changed when the STA becomes an on or off state or the STA enters or leaves the BSS region. The STA may use a synchronization process to join the BSS. To access all services of a BSS infrastructure, the STA should be associated with the BSS. Such association may be dynamically configured and may include use of a Distribution System Service (DSS).

Figure 2:
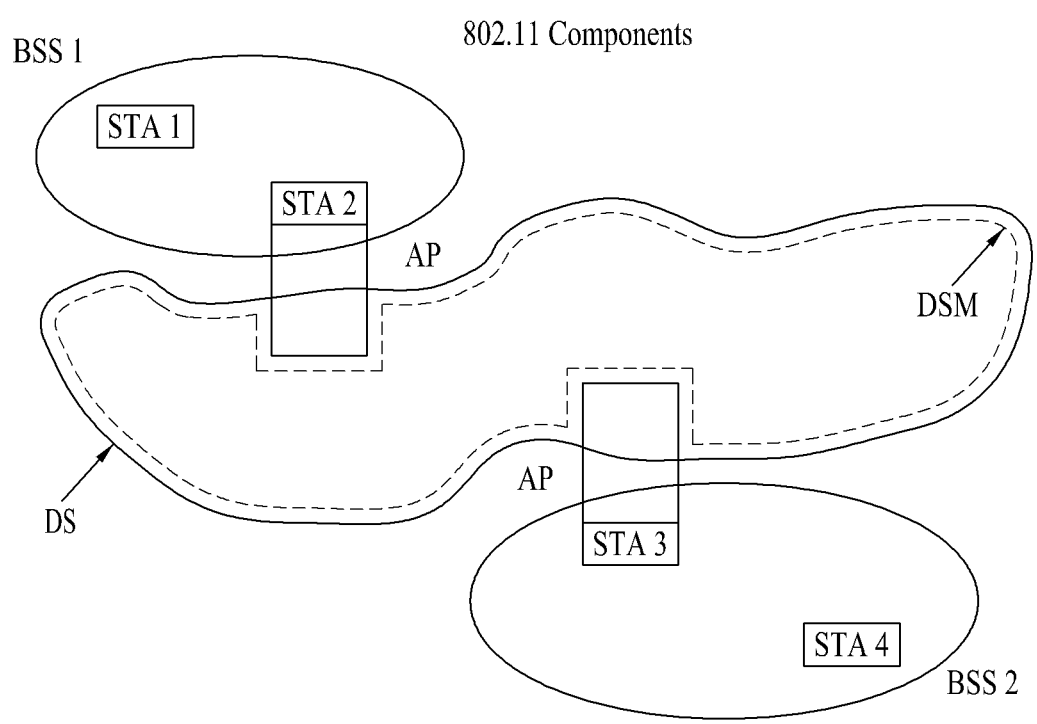
FIG. 2 is a diagram showing another exemplary structure of an IEEE 802.11 system to which the present invention is applicable.

FIG. 2 is a diagram showing another exemplary structure of an IEEE 802.11 system to which the present invention is applicable. In FIG. 2, components such as a Distribution System (DS), a Distribution System Medium (DSM), and an Access Point (AP) are added to the structure of FIG. 1.

A direct STA-to-STA distance in a LAN may be restricted by PHY performance. In some cases, such restriction of the distance may be sufficient for communication. However, in other cases, communication between STAs over a long distance may be necessary. The DS may be configured to support extended coverage.

The DS refers to a structure in which BSSs are connected to each other. Specifically, a BSS may be configured as a component of an extended form of a network consisting of a plurality of BSSs, instead of independent configuration as shown in FIG. 1.

The DS is a logical concept and may be specified by the characteristic of the DSM. In relation to this, a Wireless Medium (WM) and the DSM are logically distinguished in IEEE 802.11. Respective logical media are used for different purposes and are used by different components. In definition of IEEE 802.11, such media are not restricted to the same or different media. The flexibility of the IEEE 802.11 LAN architecture (DS architecture or other network architectures) can be explained in that a plurality of media is logically different. That is, the IEEE 802.11 LAN architecture can be variously implemented and may be independently specified by a physical characteristic of each implementation.

The DS may support mobile devices by providing seamless integration of multiple BSSs and providing logical services necessary for handling an address to a destination.

The AP refers to an entity that enables associated STAs to access the DS through a WM and that has STA functionality. Data can be moved between the BSS and the DS through the AP. For example, STA2 and STA3 shown in FIG. 2 have STA functionality and provide a function of causing associated STAs (STA1 and STA4) to access the DS. Moreover, since all APs correspond basically to STAs, all APs are addressable entities. An address used by an AP for communication on the WM needs not necessarily be identical to an address used by the AP for communication on the DSM.

Data transmitted from one of STAs associated with the AP to an STA address of the AP may be always received by an uncontrolled port and processed by an IEEE 802.1X port access entity. If the controlled port is authenticated, transmission data (or frame) may be transmitted to the DS.

Figure 3:
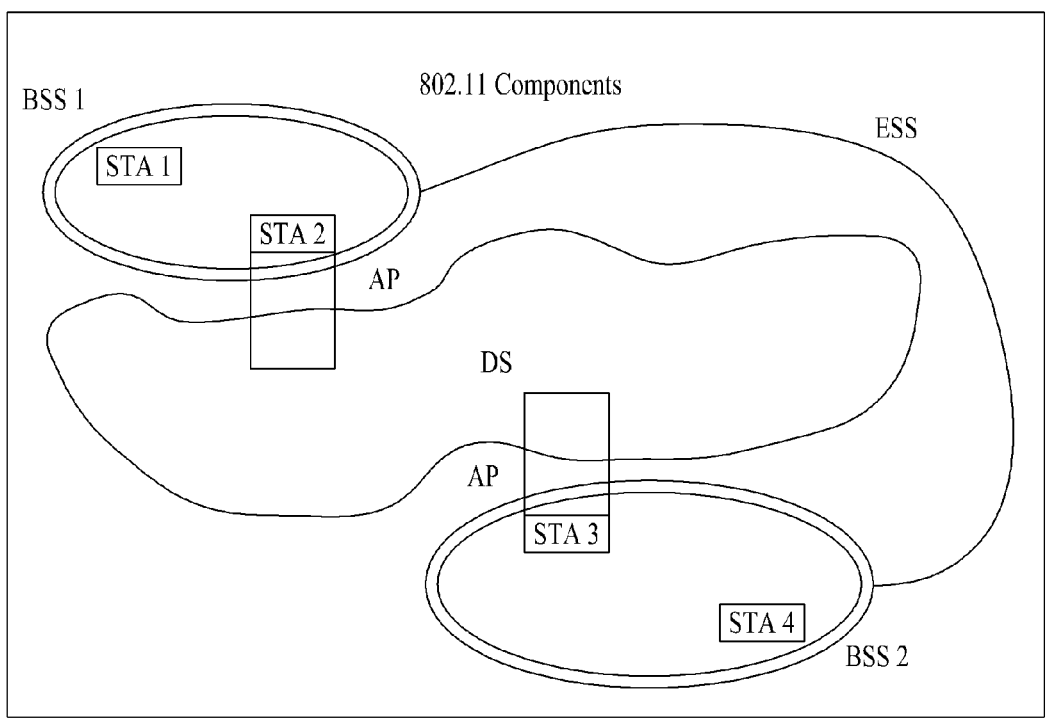
FIG. 3 is a diagram showing still another exemplary structure of an IEEE 802.11 system to which the present invention is applicable.

FIG. 3 is a diagram showing still another exemplary structure of an IEEE 802.11 system to which the present invention is applicable. In addition to the structure of FIG. 2, FIG. 3 conceptually shows an Extended Service Set (ESS) for providing wide coverage.

A wireless network having arbitrary size and complexity may be comprised of a DS and BSSs. In the IEEE 802.11 system, such a type of network is referred to an ESS network. The ESS may correspond to a set of BSSs connected to one DS. However, the ESS does not include the DS. The ESS network is characterized in that the ESS network appears as an IBSS network in a Logical Link Control (LLC) layer. STAs included in the ESS may communicate with each other and mobile STAs are movable transparently in LLC from one BSS to another BSS (within the same ESS).

In IEEE 802.11, relative physical locations of the BSSs in FIG. 3 are not assumed and the following forms are all possible. BSSs may partially overlap and this form is generally used to provide continuous coverage. BSSs may not be physically connected and the logical distances between BSSs have no limit. BSSs may be located at the same physical position and this form may be used to provide redundancy. One or more IBSSs or ESS networks may be physically located in the same space as one or more ESS networks. This may correspond to an ESS network form in the case in which an ad-hoc network operates in a location in which an ESS network is present, the case in which IEEE 802.11 networks physically overlap by different organizations, or the case in which two or more different access and security policies are necessary in the same location.

Figure 4:
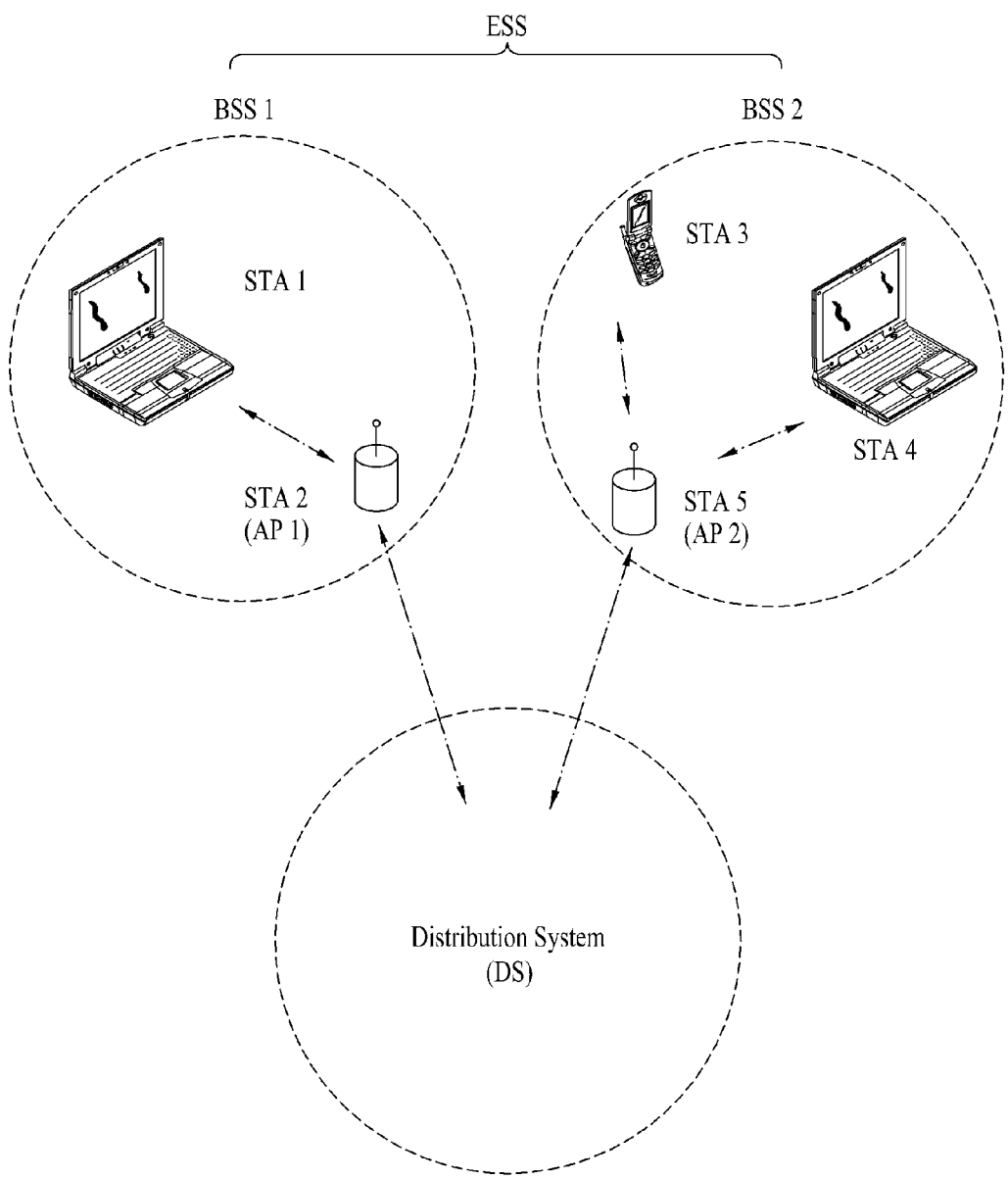
FIG. 4 is a diagram showing an exemplary structure of a WLAN system.

FIG. 4 is a diagram showing an exemplary structure of a WLAN system. In FIG. 4, an example of an infrastructure BSS including a DS is shown.

In the example of FIG. 4, BSS1 and BSS2 constitute an ESS. In the WLAN system, an STA is a device operating according to MAC/PHY regulation of IEEE 802.11. STAs include AP STAs and non-AP STAs. The non-AP STAs correspond to devices, such as mobile phones, handled directly by users. In FIG. 4, STA1, STA3, and STA4 correspond to the non-AP STAs and STA2 and STA5 correspond to AP STAs.

In the following description, the non-AP STA may be referred to as a terminal, a Wireless Transmit/Receive Unit (WTRU), a User Equipment (UE), a Mobile Station (MS), a mobile terminal, or a Mobile Subscriber Station (MSS). The AP is a concept corresponding to a Base Station (BS), a Node-B, an evolved Node-B (e-NB), a Base Transceiver System (BTS), or a femto BS in other wireless communication fields.

Available Channels in White Space

In order for an STA to operate in a white space, a protection scheme for a licensed device (or a primary user) should be provided first. Accordingly, the STA should detect available channels which are not used by the licensed device and thus can be used by an unlicensed device and should operate in the available channels.

To discern availability of a channel (e.g. a TV channel) in a white space (e.g. a TVWS), the STA may detect TV channel schedule by performing spectrum sensing or accessing a GDB. GDB information may include information about a use schedule (i.e. channel use time) of a specific channel of the licensed device in a specific location. The STA that desires to discern availability of a TV channel should acquire the GDB information based on location information thereof by accessing the GDB through the Internet etc. a prescribed number of times sufficient to protect the licensed device.

In this document, for convenience of description, information about available channels and frequencies received from the GDB may be referred to as a White Space Map (WSM). The WSM is information about channels which can be used by the unlicensed device in a TVWS band in the form of a map, based on the channel and frequency information obtained by the STA from the GDB. The WSM may include information about an available channel list or frequencies which can be used by the unlicensed device. Channels included in the available channel list are channels which are not used by signals (or users) that should be legally protected and are channels available to the unlicensed device at a time point when the unlicensed device accesses the GDB. Alternatively, when the unlicensed device requests channels which are available after a specific time from a time point when the unlicensed device accesses the GDB, the WSM may include information about available channels and frequencies starting from the corresponding time point. As another embodiment, when the unlicensed device requests the available channels by accessing the GDB, information about the available channels and frequencies may be transmitted by signaling channels which cannot be used by the unlicensed device.

In Federal Communications Commission (FCC) regulations concerning a TVWS, two types of devices are defined: a personal/portable device of low output that a user can carry and a fixed device of high output operating at a fixed location. The fixed device may be referred to as a fixed STA and the personal/portable device may be referred to as a P/P STA. Both the fixed STA and the P/P STA may correspond to general STAs (i.e. STAs include APs and non-APs) in a WLAN system. Different operation rules may be applied to these two types of devices during operation in the TVWS. The fixed device transmits/receives signals in a specific location which is not varied. The fixed device should also obtain available channel information by accessing the GDB in order to transmit signals in the corresponding location. Although the fixed device may include equipment, which can confirm a location, such as a GPS, an installer may input the location so that the location information can be transmitted to the GDB. In the case in which the installer inputs the location, it is premised that the location is not changed once the device is installed and the location of the device is input. In case of location change, the changed location should be registered. The fixed device may provide a service to other fixed devices of the same type and to P/P devices. When the fixed device receives available channel information from the GDB, the fixed device should receive available channel information thereof which can be directly used thereby by transmitting a device type thereof. Simultaneously, in order to provide a service to the P/P device, the fixed device should additionally receive available channel information which can be used by the P/P device from the GDB or from a proxy server connected to the GDB. This is because an available channel list per device type differs since channel intervals which can be used by the fixed device and the P/P device differ and requirements for a maximum permissible transmit power and a neighbor channel during operation of each of the fixed device and the P/P device differ. For example, the fixed device permits signal transmission even in frequency intervals of 512 to 608 MHz and 614 to 698 MHz as well as 54 to 60 MHz, 76 to 88 MHz, 174 to 216 MHz, and 470 to 512 MHz. However, the P/P device does not permit signal transmission in a TVWS band of a frequency band except for a frequency band of 512 to 608 MHz and 614 to 698 MHz. The fixed device may transmit signals at a higher power than the P/P device and permits a transmit power of a maximum of 4 Watts at an Effective Isotropic Radiated Power (EIRP).

The P/P device is a device which can transmit/receive signals in a non-specified location and a location thereof is variable. In most cases, the P/P can be carried by users and mobility thereof cannot be predicted. Available frequency bands of the P/P device are 512 to 608 MHz and 614 to 698 MHz and a maximum transmit power of the P/P device is 100 mW (EIRP). The P/P device is classified into two types of a mode II device and a mode I device according to whether a device has identification capabilities for the location thereof, that is, geo-location capabilities and access capabilities to the GDB through the Internet. In other words, the mode II device has geo-location capabilities and access capabilities to the GDB and may operate in the TVWS in a corresponding location after obtaining information about available channels in a location thereof by accessing the GDB. After obtaining the available channel information from the GDB, the mode II device may start a network by transmitting a signal (e.g. an enable signal) capable of commanding the mode I device to start communication. Meanwhile, the mode I device needs not to have geo-location capabilities and access capabilities to the GDB and needs to be controlled by the mode II device or the fixed device having effective available channel information by accessing the GDB. The P/P device corresponding to the mode II device may provide a service to other P/P devices. The P/P device corresponding to the mode II device may also provide a service to fixed devices and, in this case, the mode II P/P device may transmit available channel information for the fixed device, acquired from the GDB, to the fixed device.

Meanwhile, the GDB may calculate available channel information in a location requested by the unlicensed device in consideration of a channel use schedule and protection contour of a primary user of a DTV or a microphone and may transmit the available channel information to the unlicensed device. Parameters considered when the available channel information is calculated in the GDB may include a device type, a location in which the unlicensed device desires to operate, transmit power, and spectrum mask. According to FCC regulations, whether to use a neighboring channel varies with a device type. For example, even though channel numbers 29 and 30 are empty while a DTV is in use in channel number 31, the fixed device cannot use channel numbers 29 and 30 but the P/P device can use the two channels. This is because the fixed device has high transmit power which may create interference with respect to a neighboring channel.

Hereinafter, exemplary embodiments of the present invention will be described based on a TVWS, for convenience of description, as an example of a white space. However, the scope of the present invention is not limited thereto. That is, the scope of the present invention includes the exemplary embodiments applied to operation in all white spaces controlled by a GDB providing information about available channels at a specific location. For example, even in frequency bands which do not correspond to a white space but are expected to become a white space in the future, operation of the unlicensed device controlled by the GDB will be expected to be permitted and examples according to the principle of the present invention applied to such frequency bands may be within the scope of the present invention. For convenience of description, although the principle of the present invention is described based on FCC regulations concerning the TVWS, a final rule of which has currently been announced, the scope of the present invention is not limited to operation in a white space band according to FCC regulations and includes examples according to the principle of the present invention in a white space band conforming to other rules.

Link Setup in White Space

This embodiment relates to a link setup process in a TVWS. Specifically, detailed examples for link setup between a mode I device and a mode II device (or a fixed device) are described. Link setup is performed through processes of network discovery, authentication, and association. In particular, the mode I device operating in a white space needs to perform an acquisition process of available channel information during link setup.

Figure 5:
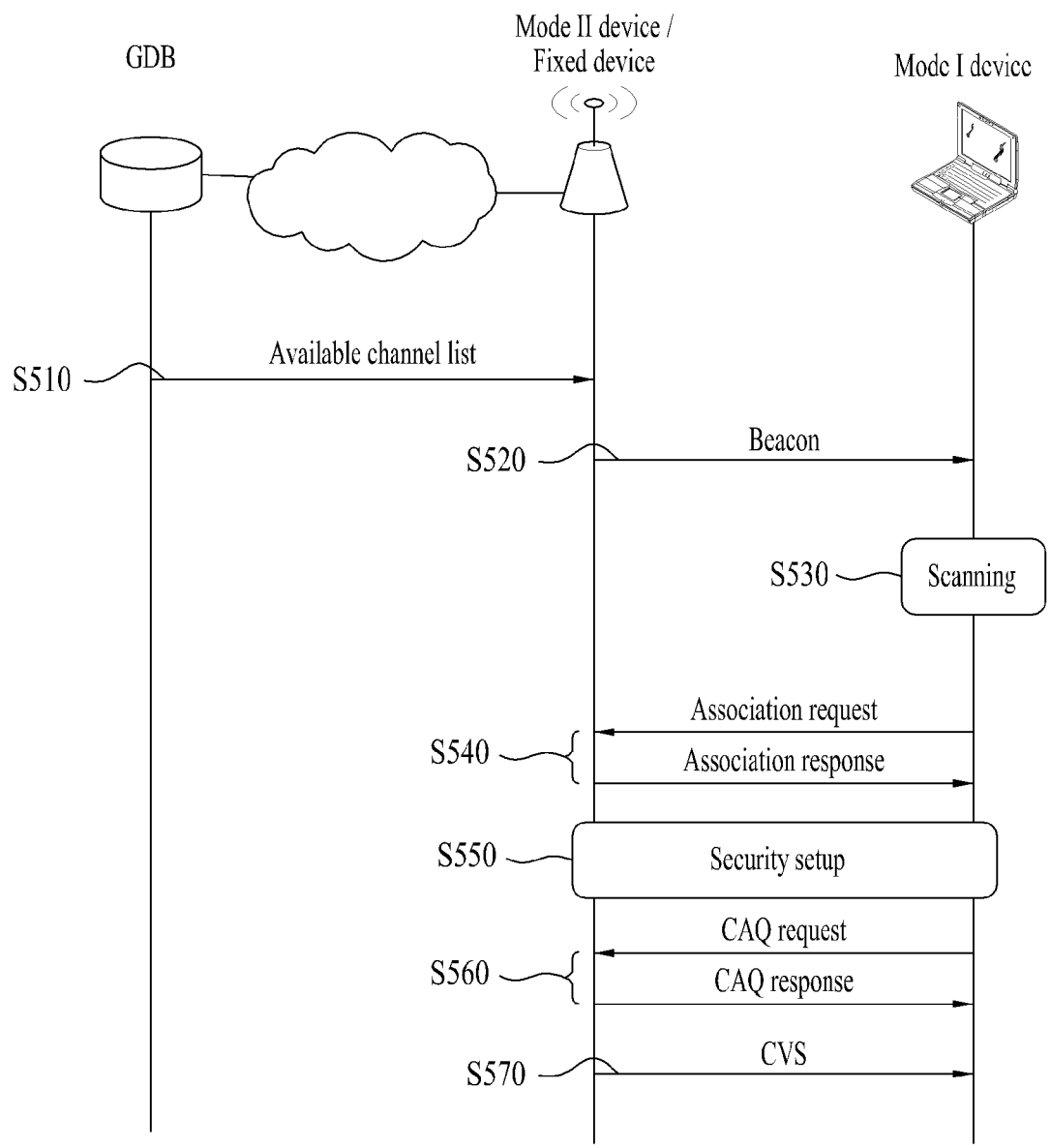
FIG. 5 is a flowchart explaining a link setup process according to an exemplary embodiment of the present invention.

FIG. 5 is a flowchart explaining a link setup process according to an exemplary embodiment of the present invention.

In step S510, a mode II device or a fixed device (hereinafter, referred to as a mode II device/fixed device) may access a GDB through the Internet to acquire an available channel list (e.g. a WSM) at a current location thereof. The mode II device/fixed device may select specific channels from the available channel list.

In step S520, the mode II device/fixed device may transmit a beacon to configure a BSS. A beacon frame may include a device type of a transmitting side (e.g. mode II device/fixed device) and the transmitting side may inform a receiving side (e.g. a Mode I device) that link setup is possible. The beacon frame may also include information about the available channel list. The beacon frame may be periodically transmitted.

In step S530, the mode I device that desires to join the BSS may perform a scanning process for a TVWS. If the mode I device is aware of the available channel list at a current location thereof, the mode I device may passively or actively perform scanning only for channels of the available channel list.

Passive scanning refers to a process in which the mode I device listens for beacon transmission from the mode II device/fixed device on a scanning channel. Active scanning refers to a process in which the mode I device transmits a probe request frame on the scanning channel and receives a probe response frame from the mode II device/fixed device.

The mode II device/fixed device may include an available channel list in the beacon frame and the probe response frame in order to reduce scanning burden of the mode I device. In the present invention, the available channel list that the mode II device/fixed device obtains from the GDB may be referred to as a WSM.

FIG. 6a is a diagram showing an exemplary WSM.

In the example of FIG. 6a, a Device Type field indicates whether an STA transmitting the WSM is a Mode II device or a fixed device. A Map ID field denotes an ID of an available channel list. A Channel Number field denotes a channel number that a mode II device/fixed device can use in a TVWS. The channel number may be expressed as a TV channel number, a spectrum range, etc. and have a meaning of information which can specify available channels in a frequency domain. A Maximum Power Level field indicates a maximum transmit power of the mode II device/fixed device in available channels. A Valid Time field denotes a duration during which the available channels can be continuously used. The Valid Time field may be optional rather than indispensable. Such a WSM may be transmitted through the beacon frame, the probe response frame, or other types of frame. The format of the WSM of FIG. 6a is purely exemplary and other types of WSMs including information about the available channels may be applied in exemplary embodiments of the present invention.

In order for the mode I device to join the BSS, the mode I device should operate under the control of the mode II device/fixed device. Accordingly, the mode I device should perform link setup with the mode II device/fixed device.

In step S540, the mode I device may perform an association process in order to participate in the BSS after completing the scanning process. To this end, the mode I device may transmit an association request frame to the mode II device/fixed device. Table 1 shows an exemplary format of the association request frame.

TABLE 1

| Order | Information | Notes |
|---|---|---|
| 1 | Capability | |
| 2 | Listen Interval | |
| 3 | SSID | |
| 4 | Supported rates | |
| 5 | Extended Supported Rates | The Extended Supported Rates element is present if there are more than eight supported rates, and it is optional otherwise. |
| 6 | Power Capability | The Power Capability element is present if dot11SpectrumManagementRequired is true or dot11RadioMeasurementActivated is true. |
| 7 | Supported Channels | The Supported Channels element is present if dot11SpectrumManagementRequired is true and dot11ExtendedChannelSwitchActivated is false. |
| 8 | RSN | The RSN element is present if dot11RSNAActivated is true. |
| 9 | QoS Capability | The QoS Capability element is present if dot11QosOption-Implemented is true. |

The above Table 1 shows parts of information which can be included in the association request frame and additional information may further be included in the association request frame.

In the exemplary embodiment of the present invention, the mode I device may further include a device ID in the association request frame so that the mode II device/fixed device can confirm the device type of the mode I device. Then, the mode II device/fixed device may confirm the device ID (e.g. an FCC ID, a serial number, etc.) of the mode I device that has requested association and determine whether the corresponding mode I device satisfies regulations demanded for TVWS operation. Thereafter, the mode II device/fixed device may transmit an association response frame to the mode I device.

According to such an exemplary embodiment of the present invention, operation after the association process is simplified as compared with a scheme in which the mode I device transmits the device ID to the mode II device/fixed device after the association process is completed. Moreover, since the device transmitting an association request can be identified during the association process, efficiency, rapidity, and accuracy of link setup can be enhanced.

FIG. 6b is a diagram showing an exemplary format of a device ID.

A Device Type field indicates whether the device transmitting the association request is a mode I device or a mode II device/fixed device. An FCC ID corresponds to a device ID value allocated by a regulatory administrator to which the device transmitting the association request belongs. An FCC ID field indicates a value corresponding to the device ID allocated by the regulatory administrator of the U.S. and may be replaced with a field including proper device ID information in another regulatory domain. A Device Serial Number field may include information about a serial number of the device transmitting the association request (e.g. an ID number allocated by a manufacturer).

If the device transmitting the association request frame is a mode II device/fixed device, the link setup process can be completed only by the association request/association response. This is because the mode II device/fixed device already has the available channel list (e.g. WSM) by accessing the GDB and does not need to be controlled by other mode II devices/fixed devices. That is, when the mode II device performs link setup, the link setup process may be completed in step S540.

Meanwhile, if the device transmitting the association request frame is a mode I device, a security setup process is performed in step S550 after the association request/response process has been successfully performed. Security setup may include, for example, private key setup through 4-way handshaking through an Extensible Authentication Protocol Over LAN (EAPOL) frame.

Security setup between the mode II device/fixed device and the mode I device is indispensable because integrity check is demanded while the mode II device/fixed device transmits the WSM to the mode I device.

In step S560, the mode I device may request the mode II device/fixed device to transmit an available channel list (e.g. WSM) by transmitting a channel availability request frame (or a Channel Availability Query (CAQ) request frame) after security setup is completed. The mode II device/fixed device may provide the available channel list (e.g. WSM) by transmitting a channel availability response frame (or a CAQ response frame) to the mode I device.

FIG. 6c is a diagram showing an exemplary format of the channel availability request frame and FIG. 6d is a diagram showing an exemplary format of the channel availability response frame.

A Category field indicates a category to which a corresponding frame belongs. In this example, the Category field may be set to a value indicating an action frame to which the channel availability request/response belongs. An Action field serves to indicate to which operation the corresponding frame relates. In this example, the Action field may be set to a specific value for the channel availability request/response. A Dialog Token field functions to match an action response with an action request and simultaneously may be used in the case in which a plurality of action requests is present. The Dialog Token field may include a value set by a request STA (e.g. mode I device).

The mode I device may complete the link setup process with the mode II device/fixed device by receiving the available channel list (e.g. WSM) through the channel availability response frame. If link setup is completed, the mode I device may start transmission and reception of data, control, and management frames with the mode II device/fixed device.

After link setup, the mode I device may periodically receive a Contact Verification Signal (CVS) from the mode II device/fixed device. The CVS may function to effectively manage a link setup state.

As shown in the exemplary format of a CVS frame of FIG. 6e, the CVS may include a Map ID of the WSM included in the mode II device/fixed device. Accordingly, the mode I device may periodically check a currently effective channel and determine that a WSM which is not indicated by a Map ID of the CVS is ineffective. That is, upon receiving the CVS frame, the mode I device compares the CVS frame with a Map ID of a WSM thereof, and if they are different, the mode I device may request a new available channel list (e.g. a WSM) by transmitting the channel availability request frame to the mode II device/fixed device.

The above-described exemplary embodiment of the present invention has described a method for efficiently and rapidly performing/supporting link setup according to a device type operating in a white space. By performing link setup, the mode I device may join a BSS under the control of the mode II device/fixed device. Hereinafter, a method in which a mode II device/fixed device configuring a BSS provides information necessary for operation in the BSS will be described according to exemplary embodiments of the present invention.

BSS Operation Information

Operation of an STA (or a mode I device) in any BSS is controlled by information (e.g. an operation information element) necessary for operation in the BSS. The operation information element may designate operating parameters applied according to device type. The operating information may be transmitted through a beacon frame, a probe response frame, or another type of frame by an AP (or a mode II device/fixed device) configuring the BSS.

FIG. 7 is a diagram showing a format of an operation information element. The operation information element of FIG. 7 may be referred to as a TVWS operation information element since the element includes parameters for operation in a TVWS or may be referred to as a TVHT operation information element since the element includes parameters for operation in a High Throughput (HT) BSS in the TVWS. Hereinbelow, the TVWS operation information element or the TVHT operation information element will be referred to as an operation information element or an operation element for simplicity.

In FIG. 7, an Element ID field may have a predetermined value for the operation information element. A Length field may have a value corresponding to the length of subsequent fields. An Operation Information field includes parameters such as bandwidth and center frequency for an operating channel. A detailed description of subfields of the Operation Information field will be described with reference to Table 2. A Basic MCS Set field may have a value corresponding to a Modulation and Coding Scheme (MCS) supported by all STAs in the BSS.

The format of the Operation Information field and details of subfields of the Operation Information field of FIG. 7 will now be described with reference to Table 2. The Operation Information field of FIG. 7 may be referred to as a TVWS operation information field or a TVHT operation information field.

TABLE 2

| | |
|---|---|
| Primary Channel width (2 bits) | Indicate the primary channel bandwidth (W). Set to 0 for 6 MHz Set to 1 for 7 MHz. Set to 2 for 8 MHz. The value 3 is reserved. |
| Channel Width (3 bits) | Set to 0 for W operating channel width. Set to 1 for 2W operating channel width. Set to 2 for W + W operating channel width. Set to 3 for 4W operating channel width. Set to 4 for 2W + 2W operating channel width. Values in the range 5 to 7 are reserved. |
| Primary Channel Offset (2 bits) | Indicates the offset of the primary channel between the contiguous operating channel width. Set to 0 if the first W MHz of the frequency segment 0 is the primary channel. Set to 1 if the second W MHz of the frequency segment 0 is the primary channel. Set to 2 if the third W MHz of the frequency segment 0 is the primary channel, Set to 2 if the fourth W MHz of the frequency segment 0 is the primary channel. |
| Secondary Channel offset (2 bits) | Indicates the offset of the secondary channel relative to the primary channel. Set to 1 (SCA) if the secondary channel is above the primary channel Set to 3 (SCB) if the secondary channel is below the primary channel Set to 0 (SCN) if no secondary channel is present The value 2 is reserved |
| Channel Center Frequency Segment 0 (8 bits) | For W MHz or 2W MHz or 4W MHz operating channel width, indicates the channel center frequency index for the W MHz or 2W MHz or 4W MHz channel on which the TV White Space BSS operates. For W + W MHz or 2W + 2W MHz operating channel |

TABLE 2-continued

| | |
|---|---|
| | width, indicates the channel center frequency index for the W MHz or 2W MHz channel of frequency segment 0 on which the VHT BSS operates. Reserved otherwise. |
| Channel Center Frequency Segment 1 (8 bits) | For an W + W MHz or 2W + 2W MHz operating channel width, indicates the channel center frequency index of the W MHz or 2W MHz channel of frequency segment 1 on which the VHT BSS operates. Reserved otherwise. |
| Allowed Device Type (8 bits) | Bit 0: Indicate that fixed device is allowd to use Channel Center Frequency Segment 0. Bit 1: Indicate that peronal portable device is allowd to use Channel Center Frequency Segment 0. Bit 2: Indicate that fixed device is allowd to use Channel Center Frequency Segment 1. Bit 3: Indicate that peronal portable device is allowd to use Channel Center Frequency Segment 1. Bit 4-Bit 7: Reserved. |

Prior to description of details of the operation information field shown in Table 2, terms for expressing the structure of a WLAN channel described in the present invention will be explained.

First, an operating channel of a BSS may be expressed as a WLAN channel and a channel of a basic unit constituting the WLAN channel is defined as a bandwidth of W MHz. In the following description, the channel of a basic unit is referred to as a W channel. The WLAN channel may include one W channel or a plurality of W channels. The plurality of W channels may be contiguous or non-contiguous in the frequency domain. A segment is comprised of one W channel or a plurality of contiguous W channels.

A primary channel is basically used for transmission of a data unit (e.g. a Physical Layer Convergence Procedure (PLCP) Protocol Data Unit (PPDU)) and may be used for transmission of a basic signal such as a beacon. The primary channel may correspond to one W channel or two contiguous W channels (i.e. 2W channels). Meanwhile, a secondary channel refers to a channel except for the primary channel.

In Table 2, a Primary Channel Width subfield denotes bandwidth of a primary channel. Since bandwidth of a TV channel differs according to country, bandwidth of the primary channel among WLAN operating channels defined in a TVWS may be differently defined per country. Accordingly, it is necessary to signal the bandwidth of the primary channel in order for an STA to correctly operate in a BSS. In Table 2, the primary channel has a bandwidth of W MHz where W is one of 6, 7, or 8 MHz.

In Table 2, a Channel Width subfield denotes a channel bandwidth of an operating channel supported by the BSS. In the TVWS, available channels are not necessarily contiguous in the frequency domain. Therefore, the WLAN operating channel in the TVWS should support both a contiguous structure and a non-contiguous structure.

Figure 8:
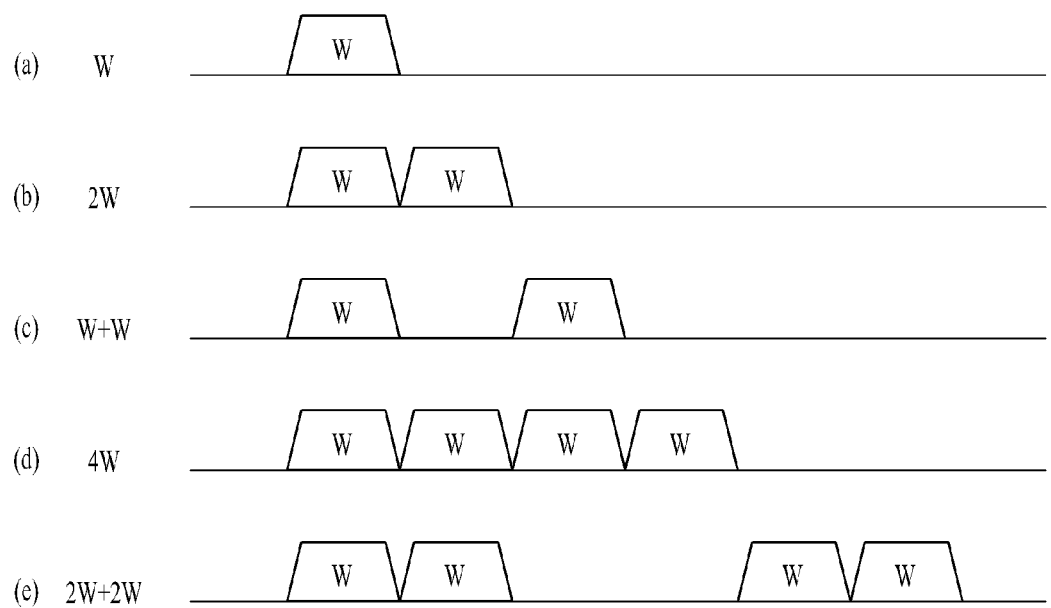
FIG. 8 is a diagram showing an exemplary form of a WLAN operating channel in a TVWS.

FIG. 8 is a diagram showing an exemplary form of a WLAN operating channel in a TVWS.

As shown in FIG. 8 and Table 2, an operating channel supported by a BSS may have the following 5 structure types. A first structure shows an operating channel comprised of one W channel which may be referred to as a W operating channel width (FIG. 8a). A second structure shows an operating channel comprised of two contiguous W channels which may be referred to as a 2W operating channel width (FIG. 8b). A third structure shows an operating channel comprised of two non-contiguous W channels which may be referred to as a W+W operating channel width (FIG. 8c). A fourth structure shows an operating channel comprised of four contiguous W channels which may be referred to as a 4W operating channel width (FIG. 8d). A fifth structure shows an operating channel comprised of two non-contiguous frequency units (i.e. segments), each frequency unit including two contiguous W channels, which may be referred to as a 2W+2W operating channel width (FIG. 8e).

The following PPDU transmission rule may be applied based on the Channel Width subfield.

A first example of the PPDU transmission rule may be defined as shown in Table 3.

TABLE 3

| Operating channel width | Permissible PPDU transmission |
|---|---|
| W | W MHz PPDU transmission |
| 2W | W MHz or 2W MHz PPDU transmission |
| W + W | W MHz or W + W MHz PPDU transmission |
| 4W | W MHz, 2W MHz, or 4W MHz PPDU transmission |
| 2W + 2W | W MHz, 2W MHz, or 2W + 2W MHz PPDU transmission |

A second example of the PPDU transmission rule may be defined as shown in Table 4.

TABLE 4

| Operating channel width | Permissible PPDU transmission |
|---|---|
| W | W MHz PPDU transmission |
| 2W | W MHz or 2W MHz PPDU transmission |
| W + W | W MHz or W + W MHz PPDU transmission |
| 4W | W MHz, W + W MHz, or 4W MHz PPDU transmission |
| 2W + 2W | W MHz, W + W MHz, or 2W + 2W MHz PPDU transmission |

The first and second PPDU transmission rules differ according to whether PPDU transmission of 2W MHZ is permitted or whether PPDU transmission of W+W MHz is permitted, in the BSS supporting a 4W operating channel width and in the BSS supporting a 2W+2W operating channel width. If a large number of contiguous channels is present in available channels, it is desirable to select the first PPDU transmission rule (i.e. the rule of Table 3), and if a large number of non-contiguous channels is present, it is desirable to select the second PPDU transmission rule (i.e. the rule of Table 4).

As described above, a plurality of permissible PPDU transmissions is present in the case of the 2W, W+W, 4W, and 2W+2W operating channel widths. It is necessary to certainly determine which type of PPDU is used. The present invention proposes a method for determining a PPDU type (i.e. permissible PPDU transmission type) based on an operating channel supported by the BSS and a PPDU bandwidth.

First, the PPDU may include a PLCP preamble field, a PLCP header field, and a data field. The PLCP preamble field includes a training field. The PLCP header field includes a SIG (signal) field. The data field includes a PSDU, etc. The SIG field included in the PLCP header field includes a BW (bandwidth) field. The BW field is defined as a size of two bits and basically serves to indicate a PPDU bandwidth of X, 2X, 4X, or 8X/4X+4X (e.g. X=20 MHz).

As stated above, the BSS operating channel width is set in the form of W, 2W, W+W, 4W, or 2W+2W based on a primary channel of W (=6, 7, or 8 MHz) in the TVWS and permissible PPDU transmission for each operating channel width may be set as shown in Table 3 or Table 4.

In other words, while the PPDU bandwidth defined by the BW field in the SIG field of the PLCP header is indicated in the form of X, 2X, 4X, or 8X/4X+4X, the PPDU transmission bandwidth according to the operating channel width which can be supported by the BSS operating in the TVWS has the form of W, 2W, W+W, 4W, or 2W+2W. That is, if the PPDU bandwidth defined by the BW field in the SIG field of the PLCP header is used, the PPDU transmission bandwidth permissible according to the BSS operating channel width in the TVWS cannot be correctly indicated. For example, a PPDU type such as X+X or 2X+2X cannot be set by the BW field in the SIG field of the PLCP header.

Accordingly, the present invention proposes a new method for determining a PPDU type based on an operating channel width (i.e. a value of a Channel Width subfield of Table 2) supported by the BSS and on a PPDU bandwidth (i.e. a value of the BW field in the SIG field of the PLCP header).

As a detailed example, if the BW field of the SIG field is a first value (or 00), the PPDU type is set to a bandwidth of W MHz. If the BW field of the SIG field is a second value (or 01), the PPDU type is set to a bandwidth of 2W or W+W MHz. If the BW field of the SIG field is a third value (or 10), the PPDU type is set to a bandwidth of 4W or 2W+2W MHz. This is summarized in the following Table 5.

TABLE 5

| BW value of SIG field | PPDU Type |
|---|---|
| First value | W MHz |
| Second value | 2W MHz or W + W MHz |
| Third value | 4W MHz or 2W + 2W MHz |

If the operating channel width supported by the BSS is considered when the PPDU type according to a BW value of the SIG field is defined as shown in Table 5, a specific PPDU type (i.e. a permissible PPDU transmission type) may be definitely determined.

For example, it is assumed that the PPDU transmission type permitted according to the operating channel width as shown in Table 3 and the PPDU type according to the BW field as shown in Table 5 are simultaneously considered. In this case, if the operating channel width is W, since only PPDU transmission of W MHz is permitted, the BW field is associated with only the first value. In the case in which the operating channel width is 2W, PPDU transmission of W MHz or 2W MHz is permitted, and if the BW value is the first value, PPDU transmission of W MHz is indicated and, if the BW value is the second value, PPDU transmission of 2W MHz is indicated (because PPDU transmission of W+W MHz is not permitted in the operating channel width of 2W). If the operating channel width is W+W, PPDU transmission of W MHz or W+W MHz is permitted. At this time, if the BW value is the first value, PPDU transmission of W MHz is indicated and, if the BW value is the second value, PPDU transmission of W+W MHz is indicated (because PPDU transmission of 2W MHz is not allowed in the operating channel width of W+W MHz). If the operating channel width is 4W, PPDU transmission of W MHz, 2W MHz, or 4W MHz is permitted. In this case, if the BW value is the first value, PPDU transmission of W MHz is indicated and, if the BW value is the second value, PPDU transmission of 2W MHz is indicated (because PPDU transmission of W+W MHz is not permitted in the operating channel width of 4W MHz). Also, if the BW value is the third value, PPDU transmission of 4W MHz is indicated (because PPDU transmission of 2W+2W MHz is not permitted in the operating channel width of 4W MHz). If the operating channel width is 2W+2W, PPDU transmission of W MHz, 2W MHz, or 2W+2W MHz is permitted. At this time, if the BW value is the first value, PPDU transmission of W MHz is indicated and, if the BW value is the second value, PPDU transmission of 2W MHz is indicated (because PPDU transmission of W+W MHz is not permitted in the operating channel width of 2W+2W MHz). Also, if the BW value is the third value, PPDU transmission of 2W+2W MHz is indicated (because PPDU transmission of 4W MHz is not permitted in the operating channel width of 2W+2W MHz). This is summarized in the following Table 6.

TABLE 6

| Operating channel width | BW value of SIG field | PPDU Type |
|---|---|---|
| W | First value | W MHz |
| 2W | First value | W MHz |
|  | Second value | 2W MHz |
| W + W | First value | W MHz |
|  | Second value | W + W MHz |
| 4W | First value | W MHz |
|  | Second value | 2W MHz |
|  | Third value | 4W MHz |
| 2W + 2W | First value | W MHz |
|  | Second value | 2W MHz |
|  | Third value | 2W + 2W MHZ |

The present invention includes a method for determining a PPDU type by a combination of Table 3 and Table 4. This can be expressed as shown in Table 7 and a detailed description thereof is omitted.

TABLE 7

| Operating channel width | BW value of SIG field | PPDU Type |
|---|---|---|
| W | First value | W MHz |
| 2W | First value | W MHz |
|  | Second value | 2W MHz |
| W + W | First value | W MHz |
|  | Second value | W + W MHz |
| 4W | First value | W MHz |
|  | Second value | W + W MHz |
|  | Third value | 4W MHz |
| 2W + 2W | First value | W MHz |
|  | Second value | W + W MHz |
|  | Third value | 2W + 2W MHz |

As shown in Table 6 and Table 7, a specific PPDU type permitted according to the operating channel width supported by the BSS can be definitely determined based on an operating channel width (i.e. a value of Channel Width subfield of Table 2) supported by the BSS and on a PPDU bandwidth (i.e. a value of the BW field in the SIG field of the PLCP header) and a PPDU type of a form which is not indicated by the existing BW field (e.g. W+W or 2W+2W) can be definitely determined.

Meanwhile, if four states of the BW field in the SIG field of the PLCP header are all used as opposed to the example of Table 5, the PPDU type permitted according to the operating channel width may be defined differently from the above examples. For example, if the BW field indicates a first value (or 00), the PPDU type may be set to a bandwidth of W MHz. If the BW field indicates a second value (or 01), the PPDU type may be set to a bandwidth of 2W MHz. If the BW field indicates a third value (or 10), the PPDU type may be set to a bandwidth of 4W or 2W+2W MHz. If the BW field indicates a fourth value (or 11), the PPDU type may be set to a bandwidth of W+W MHz. This is summarized in the following Table 8.

TABLE 8

| BW value of SIG field | PPDU Type |
|---|---|
| First value | W MHz |
| Second value | 2W MHz |
| Third Value | 4W MHz or 2W + 2W MHz |
| Fourth value | W + W MHz |

In this case, as opposed to the examples of Table 3 and Table 4, PPDU transmission permitted according to the operating channel width may be defined as shown in Table 9.

TABLE 9

| Operating channel width | Permissible PPDU transmission |
|---|---|
| W | W MHz PPDU transmission |
| 2W | W MHz or 2W MHz PPDU transmission |
| W + W | W MHz or W + W MHz PPDU transmission |
| 4W | W MHz, 2W MHz, W + W MHz, or 4W MHz PPDU transmission |
| 2W + 2W | W MHz, 2W MHz, W + W MHz, or 2W + 2W MHz PPDU transmission |

In this case, a specific PPDU type permitted according to the operating channel width supported by the BSS can be definitely determined as shown in the following Table 10 based on an operating channel width (i.e. a value of Channel Width subfield of Table 2) supported by the BSS and on a PPDU bandwidth (i.e. a value of the BW field in the SIG field of the PLCP header).

TABLE 10

| Operating channel width | BW value of SIG field | PPDU Type |
|---|---|---|
| W | First value | W MHz |
| 2W | First value | W MHz |
| | Second value | 2W MHz |
| W + W | First value | W MHz |
| | Second value | W + W MHz |
| 4W | First value | W MHz |
| | Second value | 2W MHz |
| | Third value | 4W MHz |
| | Fourth value | W + W MHz |
| 2W + 2W | First value | W MHz |
| | Second value | 2W MHz |
| | Third value | 2W + 2W MHz |
| | Fourth value | W + W MHz |

Referring back to Table 2, a Primary Channel Offset subfield denotes the location of a primary channel when the bandwidth of a frequency segment is 2W or 4W MHz.

For example, as shown in FIG. 8e, it may be assumed that one frequency segment is defined as a bandwidth of 2W, two frequency segments (frequency segments 0 and 1) are defined, and a primary channel is located in frequency segment 0. In this case, a primary channel offset of 0 may indicate that the primary channel is located in a first W channel of frequency segment 0 and a primary channel offset of 1 may indicate that the primary channel is located in a second W channel of frequency segment 0.

As another example, when the primary channel is located in a frequency segment of a bandwidth of 4 MHz, a primary channel offset of 0 may indicate that the primary channel is located in a first W channel of frequency segment 0, a primary channel offset of 1 may indicate that the primary channel is located in a second W channel of frequency segment 0, a primary channel offset of 2 may indicate that the primary channel is located in a third W channel of frequency segment 0, and a primary channel offset of 3 may indicate that the primary channel is located in a fourth W channel of frequency segment 0.

A Secondary Channel Offset subfield of Table 2 indicates a relative location of a secondary channel based on the primary channel. A secondary channel offset of 1 may indicate that the second channel is located at a high frequency relative to the primary channel, a secondary channel offset of 3 may indicate that the secondary channel is located at a low frequency relative to the primary channel, and a secondary channel offset of 0 may indicate that no secondary channel is present.

A Channel Center Frequency Segment 0 subfield of Table 2 represents a channel center frequency value of frequency segment 0. Frequency segment 0 refers to a segment including the primary channel. For example, if the operating channel width is W, 2W, or 4W MHz, since one frequency segment is present, the Channel Center Frequency Segment 0 subfield may indicate a center frequency of a corresponding frequency segment. Meanwhile, when the operating channel width is W+W or 2W+2W, since two frequency segments (frequency segments 0 and 1) are present, the Channel Center Frequency Segment 0 subfield may indicate a center frequency of frequency segment 0 of frequency segments 0 and 1.

A Channel Center Frequency Segment 1 subfield of Table 2 indicates a channel center frequency value of frequency segment 1. Since one frequency segment (i.e. frequency segment 0) is present in the case of a contiguous channel, the Channel Center Frequency Segment 1 subfield is defined only for a non-contiguous channel. For example, if the operating channel width is W+W or 2W+2W, since two frequency segments (frequency segments 0 and 1) are present, Channel Center Frequency Segment 1 subfield may denote a center frequency of frequency segment 1 of frequency segments 0 and 1.

An Allowed Device Type subfield of Table 2 indicates whether use of a device type for each frequency segment is allowed. Specifically, whether use of a fixed device is allowed or use of a P/P device is allowed for each frequency segment may be indicated through the Allowed Device Type subfield. For example, while the fixed device (e.g. a device having a high transmit power) is not allowed to be used in available channels contiguous to a TV channel, a P/P device may be allowed to be used. If frequency segment 1 is contiguous to the TV channel, the fixed device is not allowed and the P/P device is allowed to be used. Accordingly, an AP configuring a BSS may indicate which type of device is allowed to be used with respect to each frequency segment.

The bandwidth of a channel in which the BSS operates, a location in the frequency domain, and device availability are defined by the subfields of the operation information field of Table 2 included in the operation information element of FIG. 7. The PPDU type allowed in the operating channel may be definitely determined according to the examples described with reference to Table 3 to Table 10.

The above-described various embodiments of the present invention may be independently applied or two or more embodiments thereof may be simultaneously applied.

Figure 9:
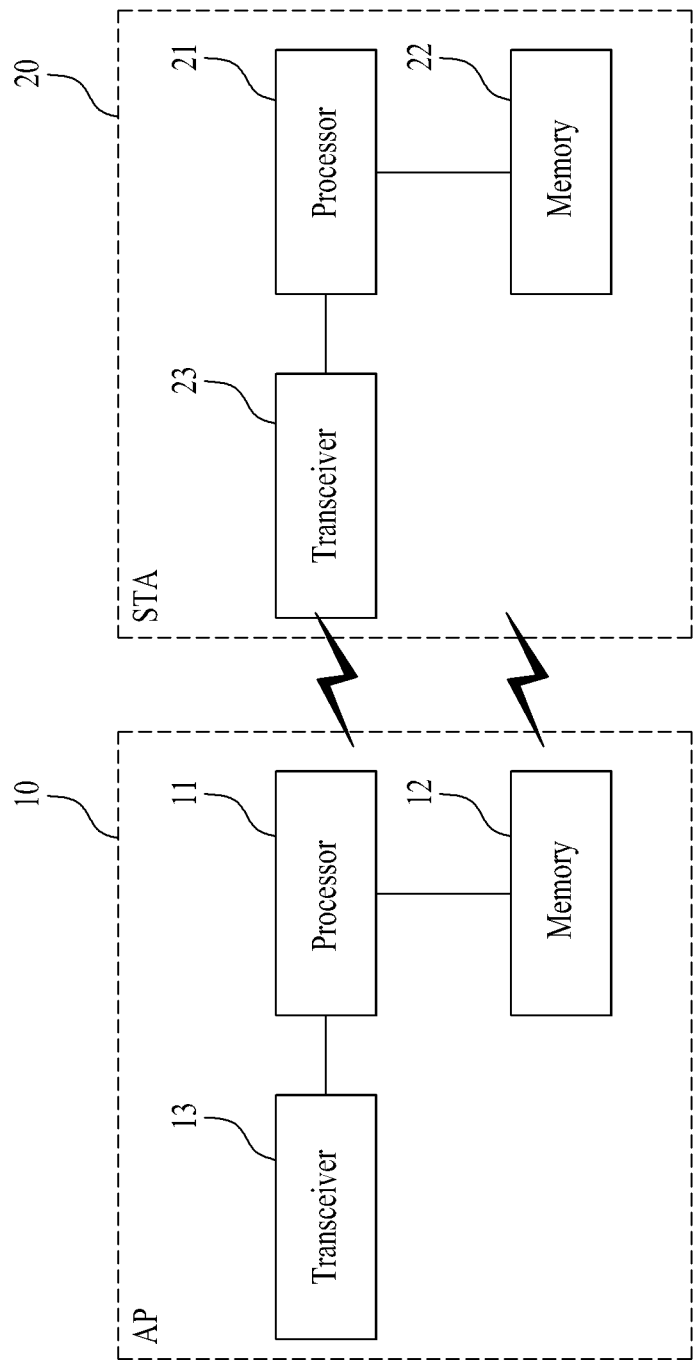
FIG. 9 is a block diagram showing a radio device according to an exemplary embodiment of the present invention.

FIG. 9 is a block diagram showing a radio device according to an exemplary embodiment of the present invention.

An AP 10 may include a processor 11, a memory 12, and a transceiver 13. An STA 20 may include a processor 21, a memory 22, and a transceiver 23. The transceivers 13 and 23 may transmit/receive radio signals and may implement a physical layer according to an IEEE 802 system. The processors 11 and 21 are connected to the transceivers 13 and 21, respectively, and may implement a physical layer and/or a MAC layer according to the IEEE 802 system. The processors 11 and 21 may be configured to operate according to the above-described various embodiments of the present invention. Modules for implementing operation of the AP and STA according to the above-described various embodiments of the present invention are stored in the memories 12 and 22 and may be implemented by the processors 11 and 21. The memories 12 and 22 may be included in the processors 11 and 21 or may be installed at the exterior of the processors 11 and 21 to be connected by a known means to the processors 11 and 21.

The overall configuration of the AP and STA may be implemented such that above-described various embodiments of the present invention may be independently applied or two or more embodiments thereof may be simultaneously applied and a repeated description is omitted for clarity.

The above-described embodiments may be implemented by various means, for example, by hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

The detailed description of the preferred embodiments of the present invention has been given to enable those skilled in the art to implement and practice the invention. Although the invention has been described with reference to the preferred embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

Although the above various embodiments of the present invention have been described based on an IEEE 802.11 system, the embodiments may be applied in the same manner to various mobile communication systems.

The invention claimed is:

1. A method for transmitting operation parameters to a station by an access point (AP) of a basic service set (BSS) operating in television whitespace (TVWS), the method comprising:
    transmitting a frame including an operation information field, the operation information field including a subfield identifying a channel width of a BSS operating channel, the BSS operating channel comprising one or more basic channel units (BCUs); and
    transmitting a SIG (signal) field in a preamble of a Physical layer Protocol Data Unit (PPDU);
    wherein the SIG field includes a field identifying a BW (bandwidth) of a PPDU transmission band, the BW of the PPDU transmission band being less than or equal to the channel width of the BSS operating channel, and
    wherein a type of the PPDU is determined to be one of contiguous multi-BCUs, non-contiguous multi-BCUs or a single BCU based on a combination of the channel width of the BSS operating channel and the BW of the PPDU transmission band.

2. The method according to claim 1, wherein a value of the channel width subfield indicates:
    a first type operating channel width for one BCU, hereafter 'W';
    a second type operating channel width for two contiguous BCUs, hereafter '2W';
    a third type operating channel width for two non-contiguous BCUs, hereafter 'W+W';
    a fourth type operating channel width for four contiguous BCUs, hereafter '4W'; or
    a fifth type operating channel width for two non-contiguous frequency blocks whereby each frequency block is comprised of two contiguous BCUs, hereafter '2W+2W';
    wherein 'W' corresponds to a width of a primary channel of the BSS operating channel.

3. The method according to claim 2, wherein the PPDU type corresponds to the single BCU, if the value of the channel width subfield indicates the first type operating channel width (W) and if the BW field has a first value.

4. The method according to claim 3,
    wherein the PPDU type corresponds to the single BCU, if the value of the channel width subfield indicates the second type operating channel width (2W) and if the BW field has the first value, and
    wherein the PPDU type corresponds to two contiguous BCUs, if the value of the channel width subfield indicates the second type operating channel width (2W) and if the BW field has a second value.

5. The method according to claim 4,
    wherein the PPDU type corresponds to the single BCU, if the value of the channel width subfield indicates the third type operating channel width (W+W) and if the BW field has the first value, and
    wherein the PPDU type corresponds to two non-contiguous BCUs, if the value of the channel width subfield indicates the third type operating channel width (W+W) and if the BW field has the second value.

6. The method according to claim 5,
    wherein the PPDU type corresponds to the single BCU, if the value of the channel width subfield indicates the fourth type operating channel width (4W) and if the BW field has the first value,
    wherein the PPDU type corresponds to two contiguous BCUs, if the value of the channel width subfield indicates the fourth type operating channel width (4W) and if the BW field has the second value, and wherein the PPDU type corresponds to four contiguous BCUs, if the value of the channel width subfield indicates the fourth type operating channel width (4W) and if the BW field has a third value.

7. The method according to claim 6, wherein the PPDU type corresponds to the single BCU, if the value of the channel width subfield indicates the fifth type operating channel width (2W+2W) and if the BW field has the first value, wherein the PPDU type corresponds to two contiguous BCUs, if the value of the channel width subfield indicates the fifth type operating channel width (2W+2W) and if the BW field has the second value, and wherein the PPDU type corresponds to two non-contiguous frequency units whereby each frequency unit is comprised of two contiguous BCUs, if the value of the channel width subfield indicates the fifth type operating channel width (2W+2W) and if the BW field has the third value.

8. The method according to claim 2, wherein the PPDU type corresponds to the single BCU if the BW field has a first value and if the value of the channel width subfield indicates one of the first type operating channel width (W), second type operating channel width (2W), third type operating channel width (W+W), fourth type operating channel width (4W), or fifth type operating channel width (2W+2W).

9. The method according to claim 2, wherein the PPDU type corresponds to two contiguous BCUs if the BW field has a second value and if the value of the channel width subfield indicates one of the second type operating channel width (2W), fourth type operating channel width (4W), or fifth type operating channel width (2W+2W).

10. The method according to claim 2, wherein the PPDU type corresponds to two non-contiguous BCUs if the BW field has a second value and if the value of the channel width subfield indicates the third type operating channel width (W+W).

11. The method according to claim 2, wherein the PPDU type corresponds to four contiguous BCUs if the BW field has a third value and if the value of the channel width subfield indicates the fourth type operating channel width (4W).

12. The method according to claim 2, wherein the PPDU type corresponds to two non-contiguous frequency units whereby each frequency unit is comprised of two contiguous BCUs, if the BW field has a third value and if the value of the channel width subfield indicates the fifth type operating channel width (2W+2W).

13. The method of claim 1, wherein the operation information field further includes a subfield that identifies a primary channel in the BSS operating channel.

14. A method for receiving operation parameters by a station from an access point (AP) of a basic service set (BSS) operating in television whitespace (TVWS), the method comprising:

receiving a frame including an operation information field, the operation information field including a subfield identifying a channel width of a BSS operating channel, the BSS operating channel comprising one or more basic channel units (BCUs); and receiving a SIG (signal) field in a preamble of a Physical layer Protocol Data Unit (PPDU);

wherein the SIG field includes a field identifying a BW (bandwidth) of a PPDU transmission band, the BW of the PPDU transmission band being less than or equal to the channel width of the BSS operating channel, and wherein a type of the PPDU is determined to be one of contiguous multi-BCUs, non-contiguous multi-BCUs or a single BCU based on a combination of the channel width of the BSS operating channel and the BW of the PPDU transmission band.

15. The method of claim 14, wherein the operation information field further includes a subfield that identifies a primary channel in the BSS operating channel.

16. An apparatus for providing operation parameters for a station operating in unlicensed spectrum, the station comprising:

a transceiver configured to perform transmission and reception with another device; and a processor configured to control the apparatus including the transceiver, wherein the processor is further configured to transmit a frame including an operation information field, the operation information field including a subfield identifying a channel width of a BSS operating channel, the BSS operating channel comprising one or more basic channel units (BCUs); and transmit a SIG (signal) field in a preamble of a Physical layer Protocol Data Unit (PPDU);

wherein the SIG field includes a field identifying a BW (bandwidth) of a PPDU transmission band, the BW of the PPDU transmission band being less than or equal to the channel width of the BSS operating channel, and wherein a type of the PPDU is determined to be one of contiguous multi-BCUs, non-contiguous multi-BCUs or a single BCU based on a combination of the channel width of the BSS operating channel and the BW of the PPDU transmission band.

17. The apparatus of claim 16, wherein the operation information field further includes a subfield that identifies a primary channel in the BSS operating channel.

18. An apparatus for receiving operation parameters for a station operating in unlicensed spectrum, the station comprising:

a transceiver configured to perform transmission and reception with another device; and a processor configured to control the apparatus including the transceiver, wherein the processor is further configured to:

receive a frame including an operation information field, the operation information field including a subfield identifying a channel width of a BSS operating channel, the BSS operating channel comprising one or more basic channel units (BCUs); and receive a SIG (signal) field in a preamble of a Physical layer Protocol Data Unit (PPDU);

wherein the SIG field includes a field identifying a BW (bandwidth) of a PPDU transmission band, the BW of the PPDU transmission band being less than or equal to the channel width of the BSS operating channel, and wherein a type of the PPDU is determined to be one of contiguous multi-BCUs, non-contiguous multi-BCUs or a single BCU based on a combination of the channel width of the BSS operating channel and the BW of the PPDU transmission band.

19. The apparatus of claim 18, wherein the operation information field further includes a subfield that identifies a primary channel in the BSS operating channel.

* * * * *